Feb. 21, 1939.　　　　G. A. LYON　　　　2,148,212
PROCESS OF MAKING WHEEL DISKS
Filed May 8, 1936　　　3 Sheets-Sheet 1
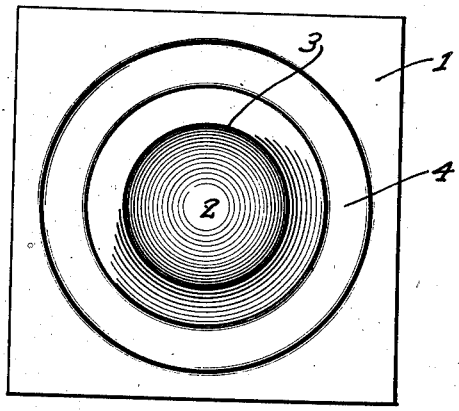
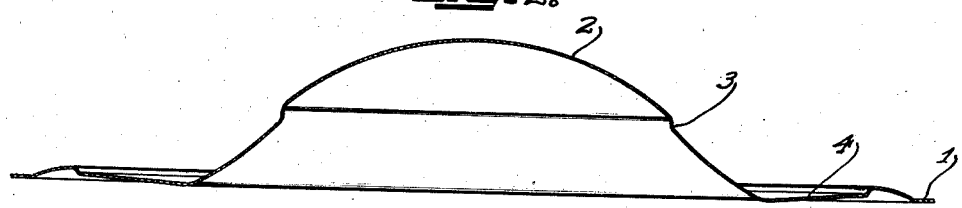
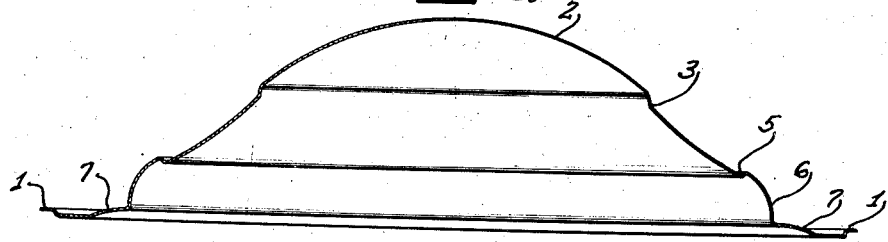
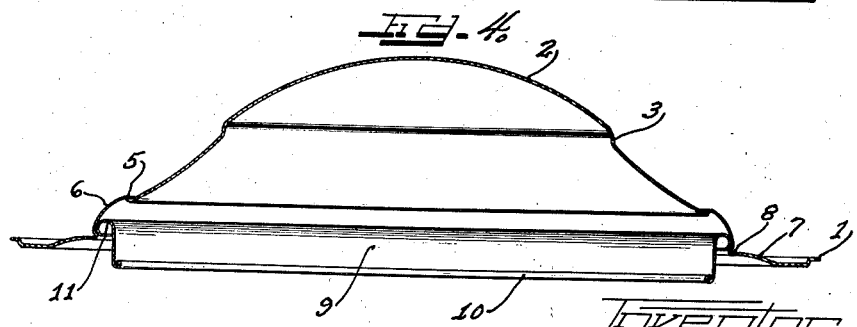
Inventor
GEORGE ALBERT LYON.

Feb. 21, 1939.　　　　G. A. LYON　　　　2,148,212
PROCESS OF MAKING WHEEL DISKS
Filed May 8, 1936　　　3 Sheets-Sheet 2
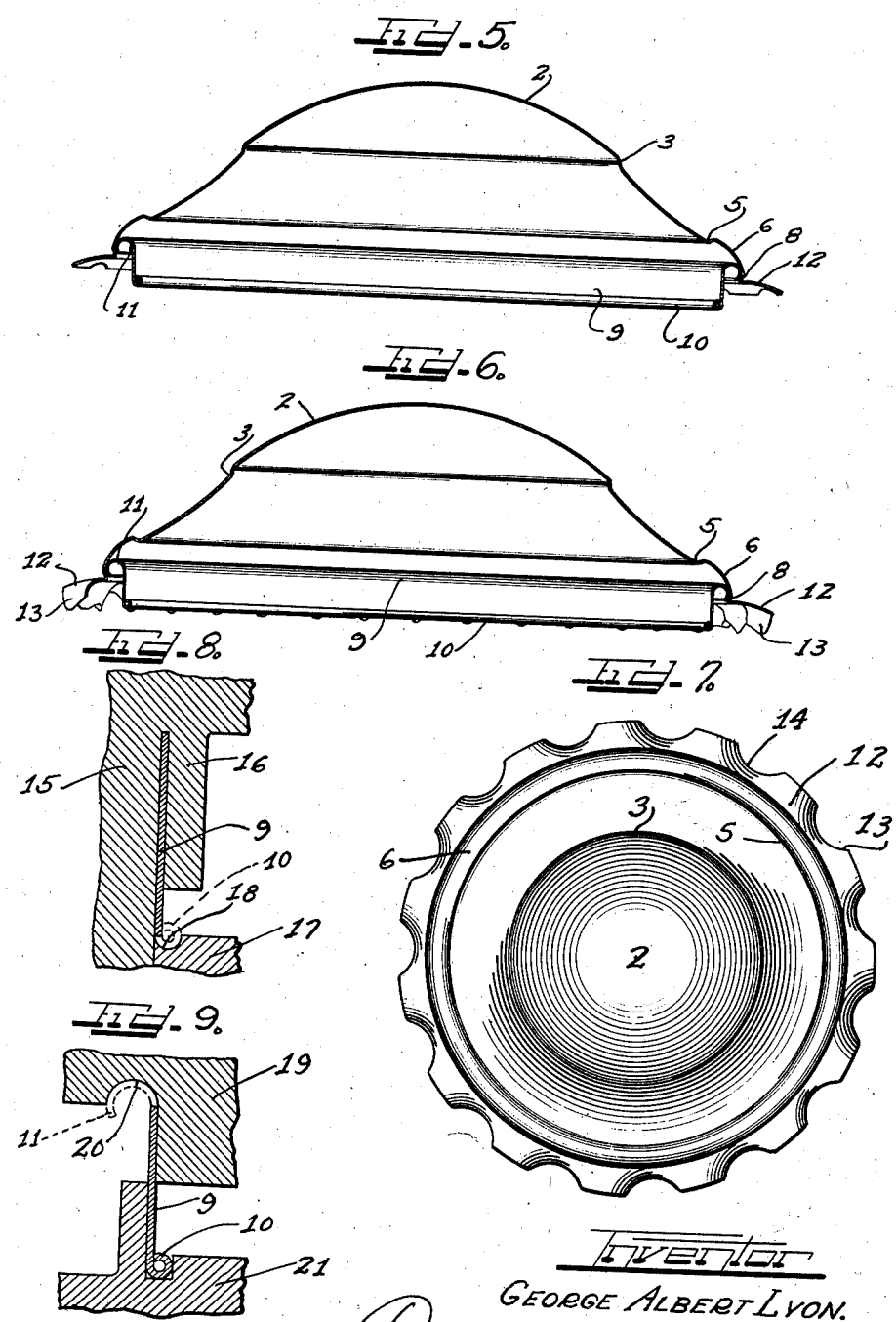
Inventor
GEORGE ALBERT LYON.
by Charles W. Hills Attys.

Feb. 21, 1939.  G. A. LYON  2,148,212
PROCESS OF MAKING WHEEL DISKS
Filed May 8, 1936  3 Sheets-Sheet 3
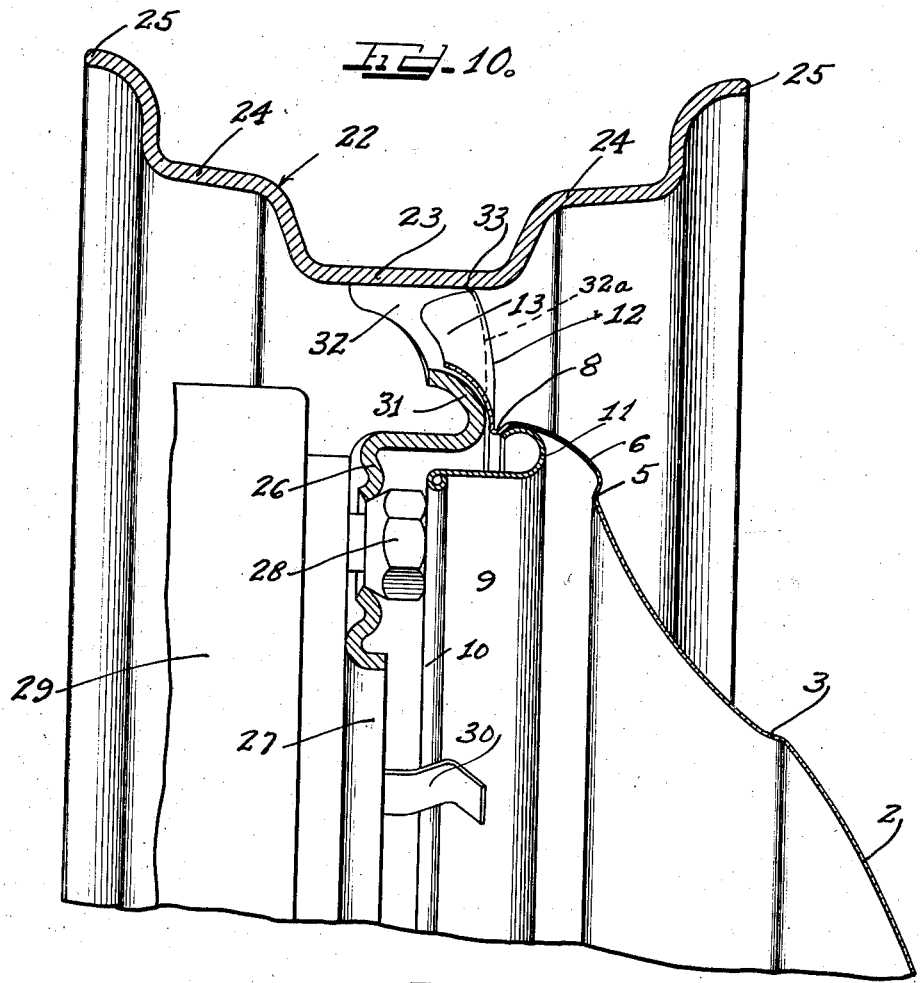
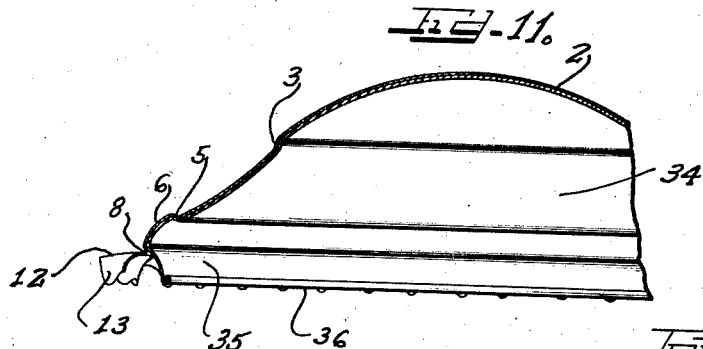
Inventor
GEORGE ALBERT LYON.
by Charles T. Hill Attys.

Patented Feb. 21, 1939

2,148,212

UNITED STATES PATENT OFFICE 2,148,212

PROCESS OF MAKING WHEEL DISKS

George Albert Lyon, Detroit, Mich.

Application May 8, 1936, Serial No. 78,553

3 Claims. (Cl. 29—159.01)

This invention relates to improvements in a method of making wheel disks for attachment over the side surfaces of vehicle wheels.

In the past, hub caps and wheel disks have been frequently made by attaching an outer finished shell of relatively light material over a similarly shaped core of relatively heavy material. Frequently, this lighter outer shell is made of a relatively soft metal, such as brass, due to the fact that it can be finished in any desirable manner rather economically. However, pebbles, stones and the like are frequently thrown against the wheel disk by the wheels of a moving vehicle with considerable impact force, and the lighter outer shell is thus dinged, nicked or sometimes peeled from the inner stronger shell, thus rendering the disk useless in improving the appearance of the vehicle. Difficulty has also been experienced heretofore in the manufacture of wheel disks in a desirably economical manner.

With the foregoing in mind, it is an object of the present invention to provide a method of making a wheel disk out of relatively sturdy and strong stock in such a manner that the central part of the disk will be maintained under a stretching tension, in a manner similar to that of a drum head, and will therefore be better able to resist the blows of objects thrown thereagainst, the objects rebounding from the disk with little or no injury to the disk.

The present invention also includes the provision of a method including the steps of stretching a piece of sheet metal over an annular inner member and clinching the stretched metal over the inner member while it is under tension to add to the tension and maintain the tension.

Another object of the invention is the provision of a method of making a wheel disk in two parts, comprising the steps of stretching the metal of the disk and clinching the same while under tension over a fastening flange to maintain the central part of the disk under tension.

The invention also contemplates the provision of a new and novel method of making a disk-retaining flange.

Another feature of the invention is the provision of a new and novel method of making the disk shell in an economical manner.

Still another objects of the invention is the provision of a new and novel method of attaching the outer shell part of the disk to the retaining flange.

A further feature of the invention resides in the provision of a new and novel method of forming the entire disk, including the attaching of the same to a retaining flange, and the formation of the outer part of the disk in a manner to place this part under tension when the disk is attached to the wheel, so as to substantially eliminate rattling, drumming and similar noises.

It is also a feature of this invention to provide a method of making a wheel disk in which the central portion of the disk is placed under a tension, and the disk is ribbed in this region to rigidify the same and aid in maintaining such tension.

Still a further feature of the invention is the provision of a new and novel method of making a wheel disk out of stainless steel.

Also a feature of this invention is the provision of a method of making a wheel disk, including the steps of attaching an outer shell over an inner shell of similar configuration, the inner shell carrying a retaining flange, and clinching the outer shell to the inner shell in a manner to maintain tension in the outer shell.

Still a further object of the present invention is the provision of a new and novel method of making a wheel disk in which the central portion of the disk is maintained under tension in the manner of a drum head and clinched around annular retaining means, and the outer portion of the disk is shaped in simulation of a spoked wheel, but further shaped to provide edge contact with a wheel, the spoke-simulated parts other than the outer edges thereof remaining slightly spaced from the wheel.

In general, the invention contemplates the steps of initially making a retaining flange, preferably by suitable die mechanism, in which an annular strip of material is provided with an inwardly turned inner edge and an outwardly turned outer edge, the inner edge being for the purpose of engagement with spring retaining elements carried by the vehicle wheel.

A flat blank of sheet metal, preferably stainless steel, is die-formed into the disk proper. The initial steps in the die-forming operation are to outline the general contour of the disk and bulge the central portion of the blank in general simulation of a hub cap. This bulging operation usually results in a slight lessening of the thickness of the material in the center of the bulged portion and also places the stock of the bulged portion under a stretching tension. Contemporaneously with the forming of the central part, this part is provided with one or more ribs to rigidity the disk and aid in maintaining such tension. After the central part has been so raised, shaped and stretched, it is next clinched over the aforesaid retaining flange while under tension or in other words, while still in a stressed and stretched condition. The clinching operation not only adds to the tension, but results in a structure wherein the tension or stressed is maintained, so that the central portion of the disk is under tension or retained in a stressed condition in the manner of a drum head. Preferably after the attaching of the disk proper to the retaining flange in the manner outlined above, the outer portion of the disk is serrated and shaped to simulate a spoked wheel. This spoked portion is also transversely arched so that when the disk is placed upon the wheel, it will only contact the wheel at the outer edge of the spoked portion in addition to the contact between the retaining flange and the spring retaining elements. Thus, the outer portion of the disk will be placed under a tension sufficient to substantially eliminate rattling, drumming and similar noises.

During the formation of the disk before the same is clinched around the retaining flange, an undercut groove is provided in the clinching operation, in which groove a suitable pry-off tool may be engaged, fulcrumed against the rim of a wheel, and the disk pried off the wheel.

Other and further important objects, features and advantages of the present invention will become apparent from the disclosures hereinafter, taken in conjunction with the accompanying drawings, in which:

Figure 1 is a top plan view of a blank of material illustrating the first step in the process of forming a wheel disk;

Figure 2 is an enlarged central vertical sectional view of the structure shown in Figure 1;

Figure 3 is a central vertical sectional view of a further step in the making of the disk;

Figure 4 is a central vertical sectional view illustrating the union of the disk shell with a fastening flange;

Figure 5 is a central vertical sectional view illustrating a further step in the making of the disk;

Figure 6 is a central vertical sectional view of the complete disk;

Figure 7 is a reduced top plan view of the complete disk seen in Figure 6;

Figure 8 is a fragmentary somewhat diagrammatic view illustrating a step in the formation of a fastening flange;

Figure 9 is a fragmentary sectional somewhat diagrammatic view illustrating a further step in the making of the fastening flange;

Figure 10 is an enlarged fragmentary sectional view, with parts in elevation, illustrating the attachment of the completed disk to a vehicle wheel;

Figure 11 is a fragmentary central vertical sectional view of a disk of slightly different construction.

As shown on the drawings:

In the illustrated embodiments of the present invention, the structures are preferably formed by means of die-forming operations, although certain parts of the structures could equally as well be formed by spinning operations. Any suitable mechanism may be used for this purpose, compound dies being highly satisfactory.

The material used is preferably sheet metal of such gauge as to provide a sturdy and strong wheel disk which is light in weight so as to lessen the overall weight of the vehicle. For this purpose, I have found that stainless steel is a very desirable material, although, of course, other materials may be used for the formation of the disks. I am not aware that heretofore stainless steel has been utilized for this purpose, and this material affords an extremely sturdy disk. Further, stainless steel has a greater tensile strength than is necessary for this purpose and can be shaped readily with mechanism of suitable strength.

In practicing the method, a blank 1 of sheet metal is taken and die-formed, as seen in Figures 1 and 2, with a central dome-shaped part 2 defined by an annular rib 3 for strengthening purposes as well as enhancing the beauty of the disk and causing the central portion of the disk to simulate a hub cap of much smaller size than the disk itself, and an outer annular flange part 4.

In the next operation, the central part of the disk is further elevated, as seen in Figure 3, and the structure now includes the dome portion 2, the rib 3, an annular sloping part leading to another rib 5, an annular bulge 6 outside the rib 5, a relatively slightly arcuate outer annular portion 7, and the hold-down portion by which the disk is held between the die members outside the portion 7. It will be noted that the rib 5 is in the form of a groove somewhat undercut when viewed from a lateral plane, so that the rib 5 and the bulge 6 add materially to the rigidity and strength of the disk.

It will further be noted that while I have herein described the structure shown in Figures 2 and 3 as being formed in separate operations, by proper mechanisms, it would be possible to take an initially flat blank of material 1 and shape it to the form seen in Figure 3 in a single operation rather than in two operations, if such is deemed more desirable. It will also be noted that in forming the structure of Figure 3 from an initially flat blank 1, the metal in the dome portion 2 of the disk will be slightly decreased in thickness and subjected to a stretching tension, which tension to some extent will be maintained in the disk by the rib structures 3 and 5.

In Figure 4, I have illustrated the connection of the disk with a fastening flange 9, by means of which the disk is held in position over the side surface of a vehicle wheel. In this instance, the fastening flange comprises an annular ring having the inner margin turned inwardly as indicated at 10, and the outer margin turned outwardly as indicated at 11. The disk structure of Figure 3 is placed in suitable mechanism over the fastening flange, and the outer part of the bulge 6 of the disk is clinched inwardly around and under a part of the margin 11 of the fastening flange to form an undercut groove on the external side of the disk, as indicated at 8. This clinching operation results in a further stretching of the dome part of the disk, adding to the stretching tension therein and forming a structure wherein this stretching tension is maintained. In other words, the dome part of the disk is stretched in a manner similar to that of a drum head, so that the disk is better able to repel stones, pebbles and the like thrown thereagainst by the wheels of the vehicle, these objects rebounding from the surface of the disk with little or no injury to the disk.

Consequently, a disk so formed, especially if made of stainless steel, is less susceptible to mars, dinges and similar injuries than is a disk made of relatively soft metal, such as brass, overlying a central core. In addition, the present disk, being of a single thickness of material the strength of which is enhanced by the construction of the disk, cannot peel and is substantially impregnable to cracking or breaking at least in ordinary usage.

The next operation in the making of the disk is the severing of the portion outside the annular arcuate part 7 to provide the structure seen in Figure 5. By this severing operation, the part 7 is converted into a serrated portion including a plurality of projecting parts 12 with an inwardly curved recess between each projection.

In the following operation, the side portions of each of the projections 12 are turned downwardly, as indicated at 13, to form the structure seen in Figures 6 and 7. With reference to Figure 7, it will be seen that the parts 12 are thus converted into spoke-simulating parts for overlying a spoke-simulating part of the wheel, there being a notch 14 between adjacent spokes 12. The disk is now complete and ready for attachment to a vehicle wheel.

Before describing the association of the disk with a vehicle wheel, it may be better to describe the operation of making the fastening flange 9. With reference to Figures 8 and 9, it will be seen that this fastening flange is made from a single band of sheet material. Initially, the band is ring-like in form and substantially flat in cross-section in the manner of a hoop. The band is first placed between depending portions 15 and 16 of a suitable die member, these portions defining a groove therebetween of just sufficient size to receive the band. Another die member 17 is preferably in sliding contact with the inside face of the part 15 below the band. This member 17 is provided with a substantially semi-circular groove 18 therein. Accordingly, when the upper die is moved towards the lower, or the lower die moved towards the upper, as the case may be, the lower margin of the flat fastening flange is caused to follow the contour of the groove 18 and thus provide the inwardly turned part 10.

In Figure 9, I have shown an upper die member 19 having a substantially semi-circular groove 20 therein which is larger than the aforesaid groove 18. A lower die member 21 is provided with a suitable groove for receiving the now formed bead 10 on the lower part of the flange. This die member 21 projects upwardly alongside the flat part of the fastening flange to prevent a buckling of this part. As the die members 19 and 21 are brought together, the upper margin of the fastening flange is caused to follow the contour of the groove 20 and thus form the outwardly turned bead 11 on the upper part of the flange. By this simple method, the flange is completed and ready for attachment to the disk in the manner previously described.

In Figure 10, I have shown the wheel disk mounted upon a vehicle wheel which includes a drop center rim generally indicated by numeral 22 comprising a base flange 23, intermediate flanges 24—24 and side edges 25—25, all integrally connected in the usual manner. The wheel also includes a body part 26 apertured as at 27 to define an axle opening in the wheel. The body part is also provided with apertures at spaced intervals to accommodate fastening means, such as bolts 28, by means of which the wheel is attached to a vehicle part, such as the brake drum 29, or to a spare wheel carrier, as the case may be. Outside the fastening bolt circle, the body part is provided with an annular hump 31, and outside of this hump the wheel is formed to simulate spokes, including depressed portions 32 defining apertures akin to apertures between adjacent spokes and outstanding portions 32a akin to spokes between the depressed parts. The body part of the wheel is further provided with a plurality of resilient retaining members 30 extending in a substantially axial direction from the wheel for snap-on engagement with the bead 10 on the fastening flange 9 of the disk.

In placing the disk upon the wheel, it is simply necessary to position the disk evenly inside the rim and press it in an axial direction into engagement with the retaining elements 30. It will be noted that the spoke-like parts 12 of the disk contact the spoke portions 32a of the wheel preferably only at the outer edge, as indicated at 33, the remainder of these portions 12, due to their arcuate shape, being spaced slightly from the spoke portions of the wheel. Consequently, when the wheel is pressed into position with the retaining elements 30 engaged with the fastening flange, the spoke-like portions 12 of the disk will be placed under a strain and thus tend to eliminate rattling, drumming and similar noises while the vehicle is in use. As pointed out above, the central portion of the disk, namely, that part inside the undercut groove 8 is under a stretching tension in the manner of a drum head and is thus able to better repel objects thrown against the disk with little or no injury to the disk.

A suitable pry-off tool may be used with an end thereof in engagement with the disk, and a portion thereof fulcrumed against the rim of the wheel in order to remove the disk from the wheel.

In Figure 11, I have shown a step in the making of a disk of slightly different construction, wherein a shell 34 is provided of substantially the same contour as the disk or outer shell. The similarity in contour between the inner and outer shells extends to the undercut groove 8 formed when the outer shell is clinched around the inner shell. From this point inwardly, the inner shell extends inwardly in the form of a fastening flange 35 having a beaded or turned inner edge 36 for engagement with the aforesaid resilient retaining means 30 carried by the wheel. The outer shell is of the same construction as above described, and the entire disk may be utilized in the manner above described.

From the foregoing, it is apparent that I have provided a new and novel method of making a wheel disk for disposition over the outer side surface of a vehicle wheel. It will be seen that the method is economical to practice, and the practice of the method results in a disk of more sturdy construction in proportion to weight than heretofore provided. It will also be appreciated that the resultant disk may be made of stainless steel, is easy to manipulate and very durable.

I am aware that many changes may be made and numerous details of construction may be varied through a wide range without departing from the principles of this invention, and I, therefore, do not purpose limiting the patent granted hereon otherwise than is necessitated by the prior art.

I claim as my invention:
1. The method of making a wheel disk for disposition over the side surface of a vehicle wheel, including shaping a blank into wheel disk form with a bulged and stretched central part, said bulged central part being placed under stress below its elastic limit, thereby straining it, and while thus strained and under stress clinching an annular portion of said bulged part about an annular member, whereby the central portion of the bulge is maintained in a tensed condition when the stressing force is relaxed.

2. The method of making a wheel disk for disposition over the side surface of a vehicle wheel, including forming a flat blank of sheet metal with a raised central part which is placed under a stress below its elastic limit thereby stretching the metal in this part, and while thus strained and under stress providing an annular rib in said part, said annular rib being arranged to maintain the central portion of the bulge in a tensed condition when the stressing force is relaxed.

3. The method of making a wheel disk for disposition over the side surface of a vehicle wheel, including turning the side margins of an annular strip to form a retaining flange, shaping a blank of sheet metal into disk form with a bulged central part which is placed under a stress below its elastic limit, and while thus strained and under stress clinching the formed blank adjacent said flange over one of the turned margins of the flange without decreasing the stretched condition of said central part whereby the central portion of the bulge is maintained in a tensed condition when the stressing force is relaxed.

GEORGE ALBERT LYON.